United States Patent
Tweed et al.

(10) Patent No.: US 7,615,183 B2
(45) Date of Patent: Nov. 10, 2009

(54) POLYLACTIC ACID BLOWN FILM AND METHOD OF MANUFACTURING SAME

(75) Inventors: Edward Carl Tweed, Gahanna, OH (US); Henry Mike Stephens, Reynoldsburg, OH (US); Theodore Emil Riegert, Granville, OH (US)

(73) Assignee: Plastic Suppliers, Inc., Columbus, OH (US)

( * ) Notice: Subject to any disclaimer, the term of this patent is extended or adjusted under 35 U.S.C. 154(b) by 0 days.

(21) Appl. No.: 11/592,263

(22) Filed: Nov. 3, 2006

(65) Prior Publication Data

US 2007/0054073 A1 Mar. 8, 2007

Related U.S. Application Data

(62) Division of application No. 11/209,808, filed on Aug. 24, 2005.

(60) Provisional application No. 60/672,515, filed on Apr. 19, 2005, provisional application No. 60/609,827, filed on Sep. 15, 2004, provisional application No. 60/605,151, filed on Aug. 30, 2004.

(51) Int. Cl.
*B29C 55/28* (2006.01)
*B29B 13/00* (2006.01)

(52) U.S. Cl. ............... 264/563; 264/565; 264/566; 264/235.6; 264/235.8; 264/331.12

(58) Field of Classification Search ............... 264/563, 264/565, 566, 235.6, 235.8, 331.12
See application file for complete search history.

(56) References Cited

U.S. PATENT DOCUMENTS

| | | | |
|---|---|---|---|
| 2,703,316 A | * | 3/1955 | Schneider .................. 528/354 |
| 3,557,947 A | | 1/1971 | Greenwell |
| 3,910,013 A | | 10/1975 | Babineau |
| 4,255,315 A | | 3/1981 | Anspon |
| 4,333,570 A | | 6/1982 | Heider |
| 4,403,695 A | | 9/1983 | Raymoure et al. |
| 4,463,861 A | | 8/1984 | Tsubone et al. |
| 4,734,304 A | | 3/1988 | Tsubone et al. |
| 5,078,289 A | | 1/1992 | Bolton et al. |
| 5,230,906 A | | 7/1993 | Mueller |
| 5,444,113 A | | 8/1995 | Sinclair et al. |

(Continued)

FOREIGN PATENT DOCUMENTS

EP 0 979 722 B1 2/2000

(Continued)

OTHER PUBLICATIONS

"New Business: Biodegradable Plastic Film and Sheet ECOLOJLU," Mitsubishi Plastics, Inc., web page, http://www.mpi.co.jp/english/newbusi/index.htm, © 2004.

(Continued)

*Primary Examiner*—Stella Yi
(74) *Attorney, Agent, or Firm*—Gilberto M. Villacorta; Sunit Talapatra; Foley & Lardner LLP

(57) ABSTRACT

The invention provides polylactic acid (PLA) films substantially free of plasticizers and methods of manufacturing same by blown film process are provided. PLA films are environmentally degradable and have applications in, at least, packaging and labeling.

43 Claims, 1 Drawing Sheet

U.S. PATENT DOCUMENTS

| | | | |
|---|---|---|---|
| 5,460,878 | A | 10/1995 | Hostetter |
| 5,466,499 | A | 11/1995 | Takagi et al. |
| 5,753,326 | A | 5/1998 | Blackwelder |
| 5,756,577 | A | 5/1998 | Gutierrez-Villarreal |
| 5,760,118 | A * | 6/1998 | Sinclair et al. ............... 524/306 |
| 5,766,748 | A * | 6/1998 | Ikado et al. ................. 428/220 |
| 5,788,076 | A | 8/1998 | Simmons |
| 5,834,582 | A | 11/1998 | Sinclair |
| 5,844,066 | A | 12/1998 | Kakizawa |
| 5,851,610 | A | 12/1998 | Ristey et al. |
| 6,291,597 | B1 * | 9/2001 | Gruber et al. ................ 525/450 |
| 6,306,969 | B1 | 10/2001 | Patel et al. |
| 6,312,823 | B1 | 11/2001 | El-Afandi et al. |
| 6,607,996 | B1 | 8/2003 | Matsunaga et al. |
| 6,669,771 | B2 | 12/2003 | Tokiwa et al. |
| 6,713,175 | B1 | 3/2004 | Terada et al. |
| 6,756,331 | B2 * | 6/2004 | Kasemura et al. ........... 442/327 |
| 6,815,475 | B2 | 11/2004 | Donald et al. |
| 6,822,136 | B1 | 11/2004 | Niemeyer et al. |
| 6,897,260 | B2 * | 5/2005 | Vynckier .................... 525/232 |
| 7,101,935 | B2 | 9/2006 | Vynckier |
| 7,175,917 | B2 | 2/2007 | Sukigara et al. |
| 7,351,785 | B2 * | 4/2008 | Matsumoto et al. ......... 528/354 |
| 2002/0160201 | A1 * | 10/2002 | Onkura et al. .............. 428/413 |
| 2002/0192412 | A1 | 12/2002 | Satani et al. |
| 2003/0119971 | A1 | 6/2003 | Donald et al. |
| 2003/0148688 | A1 | 8/2003 | Mamiko et al. |
| 2004/0092672 | A1 | 5/2004 | Bastioli et al. |
| 2005/0098928 | A1 * | 5/2005 | Rosenbaum et al. ........ 264/492 |
| 2005/0158492 | A1 | 7/2005 | Vynckier |
| 2005/0177946 | A1 | 8/2005 | Riley |
| 2005/0203208 | A1 * | 9/2005 | Ruiz .......................... 523/124 |
| 2006/0045940 | A1 | 3/2006 | Tweed et al. |
| 2007/0054073 | A1 | 3/2007 | Tweed et al. |
| 2008/0050603 | A1 * | 2/2008 | Randall et al. .............. 428/480 |

FOREIGN PATENT DOCUMENTS

| | | |
|---|---|---|
| EP | 1 038 906 B1 | 1/2004 |
| JP | 2003 1 193 67 | 4/2003 |
| JP | 2003-155358 | 5/2003 |
| JP | 2003 253008 A | 9/2003 |
| JP | 2007216541 * | 8/2007 |
| WO | WO 03/016015 A | 2/2003 |

OTHER PUBLICATIONS

U.S. Appl. No. 11/406,530 Office Action dated Nov. 13, 2008.
U.S. Office Action, U.S. Appl. No. 11/561,771, dated Jul. 1, 2009.

* cited by examiner

POLYLACTIC ACID BLOWN FILM AND METHOD OF MANUFACTURING SAME

CLAIM OF PRIORITY

This application is a division of U.S. application Ser. No. 11/209,808, filed Aug. 24, 2005, which claims priority to U.S. application Nos. 60/605,151; 60/609,827; and 60/672,515, filed Aug. 30, 2004, Sep. 15, 2004, and Apr. 19, 2005, respectively, the disclosures of which are hereby incorporated in their entirety by reference.

FIELD OF THE INVENTION

The present invention relates generally to films produced by blown film processes. More specifically, the present invention relates to blown films comprising polylactic acid and methods of manufacturing same.

BACKGROUND OF THE INVENTION

In recent years, interest in compostable polymers, i.e. biopolymers, has greatly increased, and many companies have made efforts to market, for example, packaging materials, hygiene products, sacks, and films with compostable polymers. Polylactic acid (PLA), i.e., polylactide, or condensation polymers which are based on lactic acid, are for many reasons a very attractive group of biopolymers. Their principal degradation product, lactic acid, is a product common in nature, it is not toxic and is used widely in the food and pharmaceutical industries.

Films, particularly blown films, comprising PLA have proven difficult to manufacture. Indeed, currently available PLA blown films require the addition of additives such as plasticizers to enable their production. However, plasticizers are often undesirable for films with food-related applications; they are costly; and they seldom, if at all, are as environmentally friendly as PLA itself. To circumvent these issues, some manufacturers have resorted to manufacturing PLA film with casting methodology (e.g., cast and tenner). However, casting methodology produces films with limited applications and can be 5 to 10 times more costly than blown film processing.

Accordingly, there is a need for PLA blown films substantially free of plasticizers. There is also a need for a method of manufacturing PLA films using blown film processing.

SUMMARY OF THE INVENTION

The foregoing needs are met, to an extent, by the present invention, in which PLA blown films, which are substantially free of plasticizers, and methods of making and using same are provided.

In one embodiment of the instant invention, a method of making a PLA blown film is provided comprising (a) providing dry pellets of PLA, (b) melting the pellets to form a molten mass at a first desired viscosity value or range of values, (c) increasing the viscosity of the molten mass to a second desired viscosity value or range of values, (d) forming a heated bubble from the resulting molten mass, and (e) collapsing the bubble to form a film, in which the PLA film is substantially free of plasticizer. The pellets may be dried in a variety of different ways, including, for example, drying in a dehumidifying hopper. The melting temperature may include a wide range of temperatures. In one embodiment, the melting temperature is selected in the range from about 325° F. to about 485° F., preferably from about 375° F. to about 425° F., and more preferably at about 400° F. In some embodiments, the first viscosity value ranges from about 1,000 P to about 5,000 P at about 480° F. at an apparent shear rate of about 55 seconds$^{-1}$, preferably from about 2,000 P to about 4,000 P at about 480° F. at an apparent shear rate of about 55 seconds$^{-1}$, and more preferably about 3,000 P at about 480° F. and at an apparent shear rate of about 55 seconds$^{-1}$. In other embodiments, the second viscosity value may range from about 14,000 P to about 16,000 P at about 375° F. at an apparent shear rate of about 55 seconds$^{-1}$, preferably from about 15,500 P to about 16,500 P at about 375° F. at an apparent shear rate of about 55 seconds$^{-1}$, and more preferably about 15,000 P at about 375° F. and at an apparent shear rate of about 55 seconds$^{-1}$. The viscosity increasing step may be carried out most conveniently, but not exclusively, in a polymer cooling unit, and the step of forming a heated bubble may include a stretching step, which orients the film. Alternatively, the viscosity increasing step may be carried out by internal cooling of the die mandrel (by air or liquid fluid), controlling the temperature of the die (by heated or cooled liquid fluid), and/or by the addition of chemical viscosity enhancers, the latter being preferably added during or before the melting step.

In some embodiments of the disclosed invention, the method may further include annealing the film. The annealing step may be carried out at a variety of temperature ranges, such as a temperature ranging from about 120° F. to about 285° F., preferably from about 140° F. to about 250° F. If desired, the bubble may be heated to a temperature greater than about 100° F.

In another embodiment of the present invention, a method of pretreating a PLA polymer blend to allow the manufacture of a blown film is provided comprising (a) providing pellets of a PLA polymer blend, (b) melting the pellets to form a molten mass at a first desired viscosity value or range of values, and (c) cooling the molten mass to a second desired viscosity value or range of values. The second-desired viscosity value may fall in the range of about two times to about ten times the first desired viscosity value, and preferably in the range of about four times to about eight times the first desired viscosity value. The cooling may be performed within a polymer cooling unit, as well as by air (or liquid) cooling the die inner mandrel through which the polymer film is blown, the use of viscosity enhancers as previously noted, cooling the die by air or liquid, and combinations of these techniques.

In yet another embodiment of the present invention, a packaged good is provided comprising a consumable item and a PLA blown film wrapped around at least a portion of the consumable item. The consumable item may include batteries, cans, bottles, disposable lighters, pens and decorative items, window boxes for food items (e.g., pastries, donuts), toys, and window envelopes. The PLA blown film may be clear, matte, translucent, or opaque, and may include a packaging label, optionally printed onto the film.

In still yet another embodiment of the present invention, a blown film is provided, comprising a polylactic acid (PLA) polymer substantially free of plasticizers. The PLA polymer may have a molecular weight average of about 100,000 to about 400,000. In some embodiments, the lactide concentration may optionally be lower than about 1 percent, and/or have a mesolactide level of about 10 percent to about 20 percent.

There has thus been outlined, rather broadly, certain embodiments of the invention in order that the detailed description thereof herein may be better understood, and in order that the present contribution to the art may be better appreciated. There are, of course, additional embodiments of the invention, which may be described below and which fall within the scope of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable both of embodiments in addition to those expressly described and of being practiced and carried out in various ways. Also, it is to be understood that the phraseology and terminology employed herein, as well as the abstract, are for the purpose of description and illustration and should not be regarded as limiting.

As such, those skilled in the art may appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
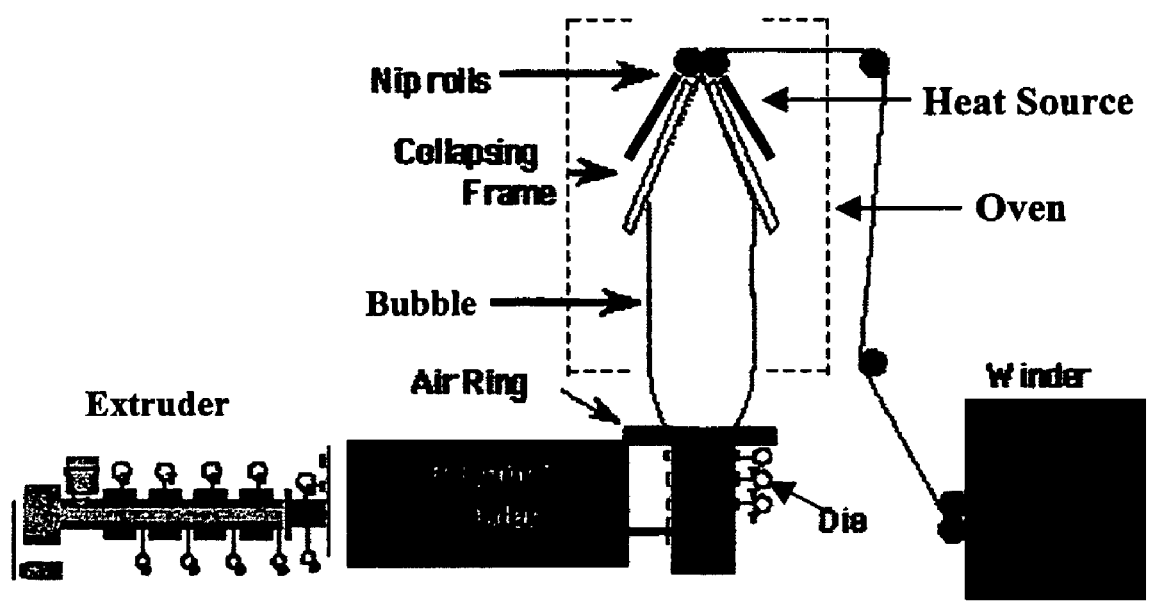
FIG. 1 is a schematic diagram of an assembly for production of PLA blown films in accordance with one embodiment of the instant invention.

Detailed embodiments of the present invention are disclosed herein. However, it is to be understood that the disclosed embodiments are merely exemplary of the present invention, which may be embodied in various systems. Therefore, specific details disclosed herein are not to be interpreted as limiting, but rather as basis for teaching one skilled in the art to variously practice the present invention.

Plastic films comprising polylactic acid films and a method of their manufacture are described. In particular, the present invention provides blown films comprising polylactic acid. The use of the term "film" includes not only film, but sheets as well.

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid. However, in typical instances, commercial polylactide will be manufactured by polymerization of lactide monomer, which is a dimer of lactic acid.

Since both lactic acid and lactide can achieve the same repeating unit, the general terms "polylactic acid," "polylactide," and "PLA" as used herein refers to polymers having the repeating unit of formula I without any limitation as to how the polymer was made (e.g., from lactides, lactic acid and/or oligomers thereof), and without reference to the degree of polymerization. As well, the terms are intended to include within their scope both polylactic acid based polymers and polylactide based polymers, with the terms used interchangeably. That is, the terms "polylactic acid," "polylactide," and "PLA" are not intended to be limiting with respect to the manner in which the polymer is formed.

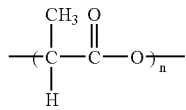

The polylactide used in the invention may be made from any lactide, or blends thereof, and by any polymerization process. A high molecular weight polymer can be produced by ring-opening polymerization from lactic acid dimer ("lactide"). Lactic acid is optically active, and thus its dimer appears in four different forms: L,L-lactide; D,D-lactide; L,D-lactide ("mesolactide"); and a racemic mixture of L,L- and D,D-lactides. By polymerizing these either as pure compounds or at different blend proportions, polymers are obtained which have different stereochemical structures, which affects their resilience and crystallinity and, consequently, also their mechanical and thermal properties. The obtained polymers are usually hard and optically clear.

Lactide polymers can be in either an essentially amorphous form or in a semi-crystalline form. For various applications it may be desirable to have the polymer in semi-crystalline form. Semi-crystalline films have, for example, superior heat resistance. As well, lactide polymer films with increased crystallinity generally degrade more slowly than amorphous films under conditions of high humidity and heat which results in extended shelf life of the films.

A desirable range of compositions for semi-crystalline poly(lactide) is less than about 15 percent by weight mesolactide and the remaining percent by weight being either L-lactide or D-lactide, wherein at least 85 percent comprises either all L- or all D-lactide isomer. A more preferred composition contains less than about 12 percent by weight mesolactide and a most preferred composition has less than about 9 percent by weight meso-lactide with the remainder being substantially all L-lactide and/or D-lactide.

Addition of even small amounts of meso-lactide to the polymerization mixture can result in a polymer which is slower to crystallize than polymerization mixtures having lesser amounts of meso-lactide. Beyond about 15 percent meso content the polymer remains essentially amorphous following the annealing procedure discussed below.

While the instant invention can be suited with any PLA polymer of any grade and composition, the concentration of D-lactide, in particular, can affect the physical properties of the resulting PLA polymer. By way of example, increasing the percent of D-lactide in a polymer or a polymer blend reduces the capacity of the resulting polymer to crystallize, which, in turn, increases undesirable degradation of the polymer at higher temperatures. Said another way, lowering the weight percent of D-lactide in a polymer composition increases the temperature resistance of the polymer and hence the viscosity of the resulting melt at a given temperature as well.

It is desirable to provide a polylactide polymer composition for a given application with desirable physical properties and desirable stability properties. Various applications for the polylactide polymer composition of the invention include the formation of fibers, coating paper, formation of films, injection molding, thermal forming, injection blow molding, preparing filmed articles, and preparing twine. It should be appreciated that stability requirements for a particular application can be more or less stringent than the stability requirements for another application. Thus, those skilled in the art will appreciate that this wide latitude of applications must be accommodated by the properties of the PLA polymers.

While specific polylactide polymer compositions for certain applications are described below, there are general characteristics desirable for the polylactide polymer composition. For example, the PLA films of the present invention comprise a plurality of polylactide polymer chains having a weight-average molecular weight (Mw) of approximately 20,000-400,000, preferably 30,000-300,000, and more preferably 40,000-200,000. This corresponds to a number-average molecular weight (Mn) of approx. 10,000-200,000, preferably 10,000-100,000.

Polylactide is in equilibrium with its monomer, lactide. This chemical property can lead to rapid hydrolysis and cause problems of adhesion in the processing of the polymer. Furthermore, the presence of any residual monomer can lower thermal stability during melt processing. Therefore, residual lactide is typically and preferably removed from the polymer. Preferable monomer content is below about 2%, and more preferably below about 1%. Even more preferably, the lactide level is less than about 0.5 weight percent or less than about 0.3 weight percent. While it is believed desirable to completely remove the lactide from the composition, this may not be practical because small amounts of lactide may re-form. Accordingly, it is expected that the lactide level may be at least above 0.001 percent by weight.

Heat, during film processing steps, can also contribute to polymer degradation. In this regard, premature hydrolysis of PLA may further be reduced by removing moisture. Accordingly, the water content of the polymer is preferably maintained below about 500 ppm, and more preferably, to below about 200 ppm. Methods to further reduce and/or maintain low water content are described herein below.

PLA is available from multiple suppliers and the polymers and/or polymer blends of the instant invention are not limited to any one grade or supplier thereof. However, Nature-Works® polymers, as supplied by Cargill Inc., are preferred in some embodiments of the instant invention (e.g., grades 4060D, 4042D, 4032D). Each of grades 4060D, 4042D and 4032D has a molecular weight average 200,000 to about 400,000, and the polymers comprise a mesolactide level of about 10 percent to about 20 percent, and a moisture level lower than about 500 ppm.

Each of the grades differ with respect to the percentages of D-lactide incorporated into the polymer. For example, grade 4042D is prepared with about 3 to about 5 weight percent D-lactide; grade 4060D comprises about 11 to about 13 percent D-lactide; and grade 4032D polymer comprises about 1 to about 2 percent D-lactide. These polymers are have a combined residual (i.e., unpolymerized) lactide concentration, if any at all, of lower than about 1 percent, and preferably lower than about 0.5 percent by weight. In a preferred embodiment of the present invention, polymer grade 4032D is used.

Copolymers or polymer blends may also be used in PLA films of the present invention, but this is by no means necessary for the functioning of the invention. Indeed, in many films, 100 percent by weight of the polymer component of the composition can be polylactide. However, in some applications, the polymer composition can include other polymers or components blended in with a polymer containing at least 50 percent, by weight, lactic acid residue repeating units. Preferably, the composition will include at least about 70 percent by weight polylactide, and more preferably at least about 90 percent by weight polylactide. It should be appreciated that the amount of polylactide present in a particular composition depends on the desired property to be imparted to that composition.

The polymer chosen for blending with polylactide is preferably one which has the properties necessary for the particular need and is compatible with the PLA. Incompatibility often results in a polymer blend which has inferior properties, such as very low tensile resistance, rheological properties, degradability, and barrier properties to oxygen, moisture or carbon dioxide.

Polymers which may be useful for improving the film properties of PLA include aliphatic polyesters or polyamides made by both ring opening and condensation polymerization, esterified cellulose resins, derivitized starch, polyvinylacetate and any of its partially hydrolyzed products including polyvinylalcohol, polyethers including poly(ethylene oxide), polycarbonates, polyurethanes including those based on aliphatic isocyanates, polyanhydrides, natural rubber and its derivatives including epoxidized natural rubber, block copolymers of styrene and isoprene or butadiene and the hydrogenated version of those polymers, polyacrylates and methacrylates, polyolefins, and polystyrene.

These polymers may be blended with poly(lactide) in percentages of 1 to 95 percent make films of improved properties. Examples of particular interest include polymers which are also degradable including poly(caprolactone), poly(hydroxybutyrate hydroxyvalerate), cellulose acetate, cellulose acetate butyrate, cellulose acetate propionate, and poly(vinyl alcohol).

Plasticizers

In accordance with one embodiment of the present invention, the inventive methods described herein enable to manufacture of PLA blown films substantially free of plasticizers commonly known, available, and used by one of ordinary skill in the art. Commonly available commercial plasticizers include, for example, mono- and polycarboxylic acid esters, polymeric polyesters, polyalkyl ethers, and glycerol, glycol esters (e.g., glycerol triacetate and glycerol tripropionate), and blends of thereof. Also various polymeric plasticizers such as citrate esters, adipate esters, epoxidized soy oils, acetylated coconut oil, linseed oil, and mixtures thereof are suitable. As well, it is commonly appreciated that the addition of lactic acid, lactides (including, D- and L-lactide, meso and racemic D,L-lactide), oligomers of lactic acid, oligomers of lactide, and mixtures thereof, in a PLA blend may act as plasticizers of the polymer.

Alternatively, when desired, the teachings of the present invention allow for PLA films to be blown with substantially less plasticizer than commonly used by one of ordinary skill in the art. By way of example, blown PLA films of the present invention may comprise a plasticizer in less than about 2 percent by weight, and more preferably less than about 1 percent by weight. When a lactide (or lactic acid) is selected for plasticity, the composition preferably comprises, by weight, less than about 10 percent, preferably less than about 5 percent, and more preferably less than about 2 percent lactide monomers.

Films of the instant invention comprise PLA, and may optionally include additives known in the art, e.g., antiblock additives, slip additives and "viscosity enhancers." It should be noted that these additives not essential for blowing the PLA films per se, but may be preferentially employed to enhance the processing, performance and look of the final product as will be discussed below. In each of the aforementioned classes, various grades of the respective polymers are understood to be included. Each of these classes of polymers and additives will now be discussed, in turn, as relevant to the instant invention.

Antiblock Additives

Antiblock (also called "antitack") additives serve to improve processing and application of polymer films. Specifically, this class of additives is used to reduce the adhesion between films. Antiblock agents—typically finely divided, solid minerals—act by producing a slight roughening of the surface. Antiblock agents are mainly used in film extrusion and include natural silica, synthetic silica, talc and calcium carbonate.

Antiblock additives are typically "loaded" with a carrier compound. While it is by no means a requirement, it is preferable that the carrier polymer be similar to or equivalent to one or all of the polymers in the master PLA blend. In the instant invention, for example, it is preferred that the carrier polymer be a PLA polymer. As the "active ingredient" in an antiblock comprises only a small fraction of the final composition, adding a carrier compound provides ease and consistency in measurements. One of ordinary skill in the art would recognize to take the concentration of filler into account when calculating the final concentration of antiblock in the final product. For example, if a composition comprising 10 percent antiblock consists of 10 percent "active ingredient," the final concentration of the "active ingredient" is 1.0 percent of the total. The values hereinbelow, including those in Table 1, are provided as a percentage of the "active ingredient" in the final formulation.

In the instant invention, the final concentration of antiblock is less than about 3 percent by weight, preferably less than about 2 percent by weight, and more preferably less than about 1 percent by weight. In one embodiment of the present invention, antiblock 2100D from Cargill is preferred. 2100D comprises 10 percent talc filled magnesium silicate in grade 4032D PLA carrier and has a mean particle size of less than about 1 micron.

In selecting an appropriate antiblock agent, the particle size thereof is one factor to consider. Indeed, the particle size of an antiblock agent can directly contribute to the overall smoothness of the resulting film. That is, all other factors being equal, a smaller antiblock particle size will result in a smoother film. Another factor to consider is the concentration of the antiblock. The concentration of antiblock is preferably minimized particularly, as in some cases, because antiblock additives can introduce haze to the film. Hence, particularly in applications where haze is undesirable (e.g., envelope windows, etc.), the concentration of antiblock may be minimized.

Slip Additives

Slip additives are modifiers that act as an internal lubricant to reduce the coefficient of friction (COF) between two overlapping films, for example, in films rolled after production. Indeed, lower COFs are especially desirable for film applications. These additives migrate to the surface of the plastic during and immediately after processing. That is, a nonvisible coating "blooms" to the surface to provide a microscopic "layer" of "lubricant" between two adjacent sheets of film. In this way, enhanced lubricity and slip characteristics are provided.

Accordingly, slip additives may be considered similar to antiblock additives in that they both serve to lower the COF between two overlapping films. Films of the instant invention may comprise one, both or neither class of additives. Typical slip agents are, for example, oleamide, erucamide, stearamide, behenamide, oleyl palmitamide, stearyl erucamide, ethylene bis-oleamide, N,N'-Ethylene Bis(Stearamide) (EBS), including most grades of their respective refinement. In some embodiments, EBS is a preferred slip agent, and EBS with 4032D carrier is more preferred. EBS is sold under the tradenames Advawax, Lubrol EA, and Micotomic 280.

As with antiblock agents, the "active ingredient" of slip additives is generally supplied with a carrier. Films of the instant invention comprise less than about 1 percent by weight of a slip additive (referring to the "active ingredient" only), and more preferably less than about 0.5 percent by weight. It should be noted that excessive amounts of slip additive may produce films that are excessively smooth, which can compromise the ability of substances (e.g., ink, stickers, etc.) to adhere to the surface. Thus, to enhance, for example, the printing properties of shrink films of the instant invention, the amount of slip additive may require adjustment accordingly.

Viscosity Enhancers

Although numerous methods are known and available to increase the viscosity of polymers during processing of blown films, the term "viscosity enhancer" is defined herein to encompass any chemical agent that increases or maintains the viscosity of a polymer at a given temperature. Viscosity enhancers may be introduced into the polymer blend at any time until the polymer enters the die (discussed below), however, viscosity enhancers are preferably introduced prior to extrusion, and more preferably, during blending of the polymer pellets.

Viscosity enhancers can improve the finished properties of films by preventing and/or reversing the degradation encountered during processing of polymer films. Some viscosity enhancers are "stabilizers." That is, they are used in virgin plastic to either (1) protect against degradation in processing and/or (2) reverse the degradation caused by recycling, and return the plastic to nearly its original performance properties. Another class of viscosity enhancers, "coupling agents," for example, improves the processability of extruded polymer by "coupling" individual polymer strands thereby increasing the melt strength of the plastic.

Viscosity enhancers are generally known and available to one of ordinary skill in the art and have their broadest application with polyesters, polyamides (nylon) and polycarbonates. It is believed that viscosity enhancers have heretofore never been successfully applied to PLA film technology. Though the chemical identity of viscosity enhancers is generally proprietary, the products are available from vendors such as Johnson Polymer LLC (USA) and Clariant International Ltd. (Switzerland). Viscosity enhancers suitable in the instant invention are not limited to those exemplified and/or those with similar mechanisms. In fact, any chemical agent that increases or maintains the viscosity of a polymer at a given temperature may suffice.

In a preferred embodiment of the invention, films are generated comprising a coupling agent for enhancing viscosity. Once such coupling agent, CESA®-extend, is available from Clariant. These viscosity enhancers contain a proprietary copolymer of styrene, methyl methacrylate and glycidyl methacrylate. Without being limited by or bound to theory, CESA®-extend viscosity enhancers are thought to repair the damage (e.g., polymer breakdown) that heat and moisture can cause to PLA resins by coupling individual PLA polymers. In this way, the Viscosity enhancer may "extend" polymer chains in the presence of some degradation and thereby attenuate overall loss of molecular weight and viscosity of the polymer melt.

Optimum reactivity of CESAS®-extend can be achieved with a preferable use level of less than about 0.5 percent by weight, and preferably less than about 0.25 percent by weight. minutes, the "active ingredient" of viscosity enhancers is generally supplied with a carrier. CESA®-extend viscosity enhancers may undergo a process residence time of about 2 to about 20 minutes, depending on starting moisture and/or inherent starting viscosity of the polymer. As well, process residence times are preferably minimized to attenuate polymer degradation from the heat required in the process. A detailed discussion of processing conditions is provided below. In any event, one of ordinary skill in the art would appreciate that may be necessary to adjust the concentration of any polymer enhancer based, at least, on some of the factors listed above.

In some embodiments, polymers for films may be selected from one, two or each of four groups (i.e., PLA, antiblock and slip additives, viscosity enhancers) and combined to create blended polymer films. Table 1 below provides non-limiting examples of formulations that may be suitable in the preparation of films of the present invention. For clarity in description, a skilled artisan should appreciate from the teachings herein that the percent of additives calculated is only the "active ingredient." In other words, while it should be appreciated that the additives are generally supplied in as a combination of "active ingredient" and carrier, the percent of carrier, if any, has not been listed.

TABLE 1

Polymer Formulations

Composition (percentage by weight)

| No. | 4060D | 4042D | 4032D | Anti-block | Slip | Visc. Enhancer |
|---|---|---|---|---|---|---|
| 1 | 69.58% | 0% | 30% | 0.15% | 0.18% | 0.09% |
| 2 | 97.50% | 0% | 0% | 1.50% | 0.50% | 0.50% |
| 3 | 0% | 0% | 99.58% | 0.15% | 0.18% | 0.09% |
| 4 | 0% | 0% | 97.50% | 1.50% | 0.50% | 0.50% |
| 5 | 0% | 98.58% | 0% | 0.15% | 0.18% | 0.09% |
| 6 | 0% | 98% | 0% | 1.50% | 0.50% | 0.50% |
| 7 | 98.58% | 0% | 0% | 0.15% | 0.18% | 0.09% |
| 8 | 59.58% | 10% | 30% | 0.15% | 0.18% | 0.09% |
| 9 | 49.58% | 20% | 30% | 0.15% | 0.18% | 0.09% |
| 10 | 39.58% | 30% | 30% | 0.15% | 0.18% | 0.09% |
| 11 | 48.61% | 30% | 20% | 1.12% | 0.18% | 0.09% |
| 12 | 48% | 30% | 20% | 1.00% | 0.50% | 0.50% |
| 13 | 30% | 20% | 48% | 1.00% | 0.50% | 0.50% |
| 14 | 30% | 30% | 39.58% | 0.15% | 0.18% | 0.09% |
| 15 | 30% | 0% | 68.85% | 0.15% | 0.50% | 0.50% |
| 16 | 68.85% | 0% | 30% | 0.15% | 0.50% | 0.50% |
| 17 | 0% | 68.85% | 30% | 0.15% | 0.50% | 0.50% |
| 18 | 30% | 68.85% | 0% | 0.15% | 0.50% | 0.50% |
| 19 | 29.58% | 30% | 40% | 0.15% | 0.18% | 0.09% |
| 20 | 70% | 0% | 29% | 0.50% | 0.25% | 0.25% |
| 21 | 29% | 0% | 70% | 0.50% | 0.25% | 0.25% |
| 22 | 99% | 0% | 0% | 0.50% | 0.25% | 0.25% |
| 23 | 0% | 99% | 0% | 0.50% | 0.25% | 0.25% |
| 24 | 0% | 0% | 99% | 0.50% | 0.25% | 0.25% |
| 25 | 100% | 0% | 0% | 0% | 0% | 0% |
| 26 | 0% | 100% | 0% | 0% | 0% | 0% |
| 27 | 0% | 0% | 100% | 0% | 0% | 0% |
| 28 | 0% | 0% | 0% | 100% | 0% | 0% |
| 29 | 99.63% | 0% | 0% | 0.10% | 0.18% | 0.09% |
| 30 | 0% | 99.63% | 0% | 0.10% | 0.18% | 0.09% |
| 31 | 0% | 0% | 99.63% | 0.10% | 0.18% | 0.09% |
| 32 | 99.68% | 0% | 0% | 0.05% | 0.18% | 0.09% |
| 33 | 0% | 99.68% | 0% | 0.05% | 0.18% | 0.09% |
| 34 | 0% | 0% | 99.68% | 0.05% | 0.18% | 0.09% |
| 35 | 30% | 30% | 39.68% | 0.05% | 0.18% | 0.09% |
| 36 | 39.68% | 30% | 30% | 0.05% | 0.18% | 0.09% |
| 37 | 0% | 39.68% | 30% | 0.05% | 0.18% | 0.09% |

The blends in Table 1 may be chosen or prepared to create the "feel" or flexibility of the film to match an end-use application. Where all other processing parameters are equal, the ratio of PLA polymers may be adjusted in accordance with the teachings of the instant invention to provide films with desirable physical properties. For example, reducing the concentration of D-lactide (e.g., increasing weight percent 4032D) yields polymers with a higher softening point.

In a preferred embodiment, films are produced with a blend of about 95.5 weight percent 4032D PLA polymer and about 1.5 percent additives by weight. In this embodiment, the additives comprise about 3 percent by weight slip additive and about 1.5 percent of an antiblock.

Processing

Generally, blown films are created by plastic blend being fed into an extruder where it is melted and homogenized before it is pumped through a circular blown film die. See FIG. 1. The melted plastic forms a continuous tube which is drawn from the die which is inflated by rapidly moving air. The tube is the collapsed between rollers and wound onto reels. Alternatively, cast films also begin as plastic dry-blend or granules fed into an extruder where they too are melted. The difference is that they are fed through a flat die onto a chilled roller so that they cool extremely quickly before being stretched (i.e., oriented) and then are wound onto a reel.

PLA polymers are typically procured in pellets or grains. In cases where multiple polymers are to be included, the polymers pellets are first dry blended. That is, the pellets are mixed together. The processing therefrom may be reduced to essentially six steps: drying, extrusion, temperature conditioning, orienting, collapsing, and annealing. Each processing step is generally depicted in FIG. 1 and will now be described in detail.

Drying

PLA readily absorbs moisture from the atmosphere and therefore, the blended polymer pellets are preferably first dried by heating in a dryer to remove surface moisture. Without being bound by or limited to theory, it is believed that the removal of moisture content may help control the relative viscosity loss due to hydrolysis. As mentioned above, higher temperatures and the presence of even a small amount of moisture can hydrolyze PLA in the ensuing melt phase.

PLA is generally produced by a reversible condensation reaction, which produces water; when undried PLA is heated, hydrolysis can occur and key mechanical properties of the PLA may be compromised. For example, the viscosity of the polymer, when melted, is inversely proportional to the percentage of free monomer therein. Therefore, in an attempt to minimize batch-to-batch variation in viscosity, preferably, significant moisture is removed from the polymer pellets. In some embodiments a moisture content of less than about 200 ppm is preferable, and less than about 50 ppm, more preferable (measured by the Karl Fisher method).

A dehumidifying hopper with hot air at a relatively low dew point may be used; however, a variety of air dryers are known in the art and many of them may be suitable for drying. The present invention need not be limited to air dryers only, but may include other types of dryers, including baking ovens. A dehumidifying hopper may be desirable in some embodiments in that dehumidified air passes through a bed of PLA to extract moisture from the resin. A desiccant material, such as silica, absorbs moisture from the circulating air. Dual desiccant bed systems are common, so that one bed is on-stream while the stand-by bed is being regenerated. Either a time cycle or a predetermined decrease in air dew point is used to shift airflow from one bed to the other. Such methodology is thought to be effective in removing some moisture that may reside below the surface of the polymer pellets in addition to the surface moisture.

Preferable dryers of the instant invention for drying PLA may have one or more of the following characteristics:

1. Desiccant beds capable of achieving a dew point of about −40 C in the supply air
2. A means, e.g., an after-cooling unit, to eliminate or reduce the likelihood of temperature spike in the supply air
3. Excellent temperature control in the PLA drying range The temperature and duration of drying may be dependent on the total amount and condition of the polymer(s) (i.e., the amount of starting surface moisture), and may need to be adjusted on a batch-by-batch basis. Preferably, the polymers experience little to no melting in this step. By way of example, typical drying conditions require that temperatures range from about 110° F. to about 230° F., and preferably from about 130° F. to about 190 for variable periods of time. By way of example, the residence time for drying polymer with air (dew point, −40° F.) at a flow rate of greater than about 0.5 ft$^3$/min. requires about 4 hours at about 110° F. and about 2 hours at about 190° F. Higher drying temperatures may lead to softening and blocking of polymer, while lower drying temperatures will result in extended drying times and/or incomplete drying.

Dew point is an absolute measure of air moisture and is independent of air temperature. Dew point may be used to control dryer performance. Airflow is another component to drying, as it heats the resin and absorbs its moisture. Sufficient airflow can maintain the resin at the proper temperature for its entire residence time. In embodiments where additional colorants, additives, or otherwise ingredients are used, it may be preferable to minimize moisture-related degradation by further drying same.

Extrusion

Extrusion, the second processing step, is whereby the pellets are melted into a low viscosity molten mass, thus combining the heretofore individual polymer beads or grains into one molten mass. The viscosity of the melt will depend on the temperature. Temperatures can range from about the temperature at which the polymers will remain melted to about the temperature where degradation of the polymers begins to occur. By way of example, extrusion melt temperatures may be maintained between about 325° F. to about 485° F. for certain PLA polymer blends, but may ultimately depend on the different polymers that have been blended and their respective melting points. In some embodiments, about 400° F., is preferred.

By way of example, the viscosity of PLA at about 480° F. and an apparent sheer rate of about 5.5 seconds$^{-1}$ in a capillary rheometer may range from about 1,000 poise (P, dyne/cm$^2$) to about 8,000 P, preferably about 3,000 P to about 6,000 P, and more preferably, about 4,500 P. At a shear rate of about 55 seconds$^{-1}$ the same polymer at about 480° F. may have an apparent viscosity that ranges from about 1,000 P to about 5,000 P, preferably about 2,000 P to about 4,000 P, and more preferably, about 3,000 P.

Temperature Conditioning

The third step, temperature conditioning, is done to increase the viscosity of the molten polymers, which makes the melt manageable for further processing. The cooling allows for the temperature of the extruded polymer to drop to a level at which the corresponding viscosity is high enough to allow a bubble to be blown. Furthermore, it is thought that by increasing the viscosity, a smoother film surface than without this step is generated. A smoother surface aids in the printing process that is performed in many end applications, such as, for example, labels.

The cooling step may be accomplished by a variety of methods known in the art, and a variety of coolers are known in the art and may be use by one of ordinary skill in the art based on the teaching provided herein. For example, the viscosity of the polymer melt may be adjusted, alone or in combination for example, by air cooling the die inner mandrel through which the polymer film is blown, the use of viscosity enhancers noted above, controlling the die temperature with air or liquids, or polymer coolers. A Koch Engineering SMR polymer cooling unit, available from Sulzer Chemtech, USA of Tulsa, Okla., adapted for PLA use may be preferred in some applications. By "adapted," it is meant that a polymer cooler may have to be adjusted for a cooling capacity lower than that for polystyrene, for example.

The polymer cooler operating temperature range is preferably between about 280° F. to about 450° F. Higher temperatures may be used, but such higher temperatures may also contribute to degradation of the polymer. The temperature and duration of cooling can again depend on both the amount of polymer being cooled and the film properties that may be desired. In other terms, the pressure in the primary loop for polystyrene cooling is generally about 1000 psi to about 7,000 psi and, in some instances, about 5,000 psi; by contrast, the pressure in the same loop adjusted for PLA use may range from about 300 psi to about 4,000 psi.

In one example, the viscosity of PLA at 375° F. and an apparent sheer rate of about 5.5 seconds$^{-1}$ in a capillary remoter, may range from about 15,000 P to about 17,000 P, preferably about 15,500 P to about 16,500 P, and more preferably, about 16,000 P. At a shear rate of about 55 seconds$^{-1}$ the same polymer at 375° F. may have an apparent viscosity that ranges from about 14,000 P to about 16,000 P, preferably about 16,500 P to about 15,500 P, and more preferably, about 15,000 P. It will be apparent from the data presented herein that the polymer cooling step can increase the viscosity from about 2 to about 10 times that of the polymer coming out of the extruder. In other embodiments, the viscosity may be increased about 5 to about 9 times.

The polymers demonstrate a substantial increase in viscosity upon cooling in the polymer cooler, which cooling procedure, in part, is thought to allow for subsequent blowing of the film. It is also apparent that the viscosity of the PLA polymers exhibit a consistent shear viscosity of a relatively large range of shear rates at any given temperature.

Orienting

The fourth step in preparation of films of the present invention is orienting, also known as stretching. Orienting can be accomplished by many methods and associated equipment known to one of ordinary skill in the art, including, for example, machine/cross direction orientation and blown film orientation. All methods are preferably designed to first control the temperature of the polymer, followed by a controlled stretching operation. Without being limited to or bound by theory, it is believed that the orienting process conveys strength and flexibility to the film product. Furthermore, though orientation bubbles may be pulled both up or down from a die, it may be preferable to pull said bubble upward to facilitate control and maintenance of the polymer temperature during orientation.

In a preferred embodiment of the present invention, the polymer melt is already pre-cooled, preferably in a polymer cooler, and then submitted to a blown film orientation process. However, the viscosity of the polymer melt may also be adjusted, alone or in combination for example, by air cooling the die inner mandrel, the use of viscosity enhancers, and liquid thermoregulation of the die. Pre-cooling PLA polymer in a polymer cooler before blown film orienting is believed to be unique. The process of the present invention has at least one significant advantage in that a very controlled temperature—from the post extrusion temperature conditioning—can be achieved prior to the formation of a bubble. A blown film extrusion process extrudes molten plastic polymer through a die of circular cross-section and uses an air jet to inflate a bubble comprising same.

Die parameters may range from 1:0.75 BUR (Blown Up Ratio) to about 1:7.0 BUR, and preferably, about 1:4 BUR in the cross web direction. In the length (or machine) direction, die parameters may range from about 1:1 draw down ratio to about 1:300 draw down ratio, and preferably, about 1:130 draw down ratio. Orienting temperatures of the present invention range from about 100° F. to about 180° F., and more preferably, about 140° F.

In the preferred embodiment then, by virtue pre-cooling the melted polymer, only a final fine tuning of orienting temperature is performed, where desired, during the orientation process. In other words, the greater share of temperature conditioning takes place prior to orienting and not during orienting. Where a fine tuning of temperature is desired, it can be relatively easily accomplished by a temperature controlled air ring, which blows chilled air at the base of the bubble.

Collapsing

Once the extrudate has been inflated into a circular bubble, it then is "collapsed" into a double thickness film. The collapsing process is performed by use of an "A-frame," also known as a collapsing frame. This frame uses nip rollers, panels, and/or flat sticks to flatten the bubble into a sheet of double-thickness film (FIG. 1). The sheets are ultimately cut and wound onto two finish rolls, coils, of PLA film. The film can also desired length.

In accordance with another teaching of the present invention, it has also been learned that control of the film temperature while in bubble form may prevent the formation of undesirable wrinkles and/or film layers that stick together upon passage through the collapsing nip rollers. By control, it is meant that the temperature of the polymer bubble is preferably maintained at a temperature greater than about 100° F., more preferably the temperature is maintained at a range from about 100° F. to about 200° F., and even more preferably, from about 120° F. to about 140° F. The temperature of the polymer bubble may be regulated by a variety of methods, including internal circulation of warm air (e.g., internal bubble cooling (IBC)).

In one embodiment, it has been found that it may be beneficial to include a heated oven (FIG. 1) enclosure constructed around the collapsing frame—and generally extending around a portion of the bubble—to control the temperature at which the bubble is collapsed. The oven enclosure may optionally extend to and be sealed at or near the top of the bubble to better maintain insulation and temperature control. The "oven" may generally comprise any device that prevents the polymer bubble from cooling below a predetermined temperature, and may include both heated panels and/or insulation alone. In a preferred embodiment, the oven comprises a heat source preferably located at or near the top of the collapsing frame. The heat generated therefrom is then maintained and circulated within the oven by virtue of insulation encompassing the bubble.

Annealing

Annealing, also called crystallization, is the final step in the preparation of films of the instant invention. Annealing is generally accomplished post orienting, and performed at temperatures between about 120° F. to about 285° F. in some embodiments.

Exemplary Applications

The compositions and films herein provide environmentally acceptable materials because their physical deterioration and degradation is more rapid and complete than conventional non-degradable plastics that they can replace (e.g., polyethylene). That is, the intermediate products of the degradation, lactic acid and short polymers thereof, are widely distributed naturally occurring substances, which are easily metabolized by a wide variety of organisms to carbon dioxide and water. Thus, the instant PLA films may a desirable replacement for many conventional plastic films. Such applications include, but are not limited to, batteries, cans, bottles, disposable lighters, pens and decorative items, window boxes for food items (e.g., pastries, donuts), foods covering (e.g., produce packaging and bags, covering for meats, fish and vegetables), toys, floral bags and window envelopes.

PLA blown films of the present invention may also be used in applications that have traditionally used paper, for example, envelopes and signage (discussed below). In one embodiment of the invention, envelopes may be entirely constructed with the inventive PLA films described herein. Such envelopes may comprise clear, matted or opaque PLA film. As well, in the case of envelopes with windows, the front and rear walls may comprise paper with the envelope window comprising PLA film. In yet other embodiments, the front and rear walls of the envelope may comprise a clear, matted opaque PLA film and the window comprise a clear or matted PLA film.

As mentioned above, films of the instant invention may be particularly suited for printing applications. Indeed, the relatively high surface tension of PLA films makes them receptive to (printed) ink often without any additional treatment to the surface. For example, the surface energy of substantially pure polylactide films of the present invention is about 38 to about 40 dynes/cm. This leads to a surface with satisfactory printing characteristics without surface modification. Thus, inks which are typically more difficult to apply onto films, like water based inks, may be applied directly to PLA films.

The films, printed or otherwise, may also be manufactured with an adhesive on one face to provide pressure sensitive labels. These labels may be applied to a variety of consumer products, for example, bottles (e.g., beverages, shampoos, etc.) and general packaging. Other applications may include point-of-purchase labels and "piggy-back" labels (e.g., peel-off coupons on consumer products).

It should also be apparent from the teachings disclosed herein that the instant inventive films are not limited to any one gauge. That is, the thickness of the inventive films may be adjusted in accordance with techniques generally known and practiced in the art. For example, the take-off speed may be adjusted to determine the gauge. The "take-off" speed is the rate at which the bubble is pulled though the die; generally, the greater the speed, the thinner the gauge.

It may be desirable to adjust the film gauge to suit a particular application. For example, films of the instant invention may be suitable as a paper replacement for indoor and outdoor signage (e.g., plant sticks, tags, folding cartons, etc.). In applications where signage is in proximity to soil, PLA films of the instant invention may be particularly desirable for their "environmentally friendly" decomposition characteristics.

Pigments, dyes, or color agents may also be added as necessary. Examples include titanium dioxide (TiO$_2$), clays, calcium carbonate, talc, mica, silica, silicates, iron oxides and hydroxides, carbon black, magnesium oxide, quinacridone, copper phthaloryanine, ultra marine blue, anthraquinone, pyrazolone, violet B, azo dyes, 2,2'-(1,2-ethenediyldi-4,1-phenylene)bisbenzoxazole, and 2,2'-(2,5-thiophenediyl)bis(5-tert-butylbenzoxazole). In one embodiment of the instant invention, white pigment, may be added to the PLA films of the instant invention to provide colored or white films.

PLA films of the present invention may also be prepared as "white PLA." In such embodiments, TiO$_2$ is a preferable colorant, the concentration of which may range from about 1 to about 20 percent by weight, and is preferably adjusted to a desired optical density (per thickness of film). The optical density may be determined in X-Rite 301 reader. For many applications (e.g., cut and stack labels or pressure sensitive labels), a density ranging from about 0.40 to about 0.60 absorbance units is preferable, with a density of about 0.50 absorbance units being more preferable. Antiblock (e.g., talc) may be used to adjust any inherent gloss to between about 20 and about 100, preferably between about 50 to about 80, as measured at an angle of 60 degrees (ASTM D523). As with other applications described herein, while any grade of PLA (e.g., 4060D, 4042D, 4032D) may be suitable, grade 4032D is preferred. One embodiment of "white PLA" may comprise, for example, by weight, 92 percent PLA, 1.5 percent antiblock, 0.20 percent slip additive and 6.3 percent TiO$_2$.

While the invention has been described in connection with specific embodiments thereof, it will be understood that it is capable of further modifications and this application is intended to cover any variations, uses, or alterations of the invention following. In general, the principles of the invention and including such departures from the present disclosure as come within known or customary practice within the art to which the invention pertains and as may be applied to the essential features hereinbefore set forth and as follows in the scope of the appended claims.

What is claimed:

1. A method of making a polylactic acid (PLA) blown film comprising (a) obtaining dry pellets of PLA, (b) melting the pellets to form a molten mass at a first desired viscosity value ranging from about 1,000 P to about 5,000 P at about 480° F. at an apparent shear rate of about 55 seconds$^{-1}$, (c) increasing the viscosity of the molten mass to a second desired viscosity value or range of values, (d) forming a bubble from the resulting molten mass, and (e) collapsing the bubble to form a film, in which the PLA blown film is substantially free of plasticizer.

2. The method of claim 1 in which the pellets are dried in a dehumidifying hopper.

3. The method of claim 1 in which the melting step is carried out at a temperature range of about 325° F. to about 485° F.

4. The method of claim 3 in which the melting step is carried out at a temperature range of about 375° F. to about 425° F.

5. The method of claim 4 in which the melting step is carried out at a temperature of about 400° F.

6. The method of claim 1 in which the first viscosity value ranges from about 2,000 P to about 4,000 P at about 480° F. at an apparent shear rate of about 55 seconds$^{-1}$.

7. The method of claim 6 in which the first viscosity value is about 3,000 P at about 480° F. at an apparent shear rate of about 55 seconds$^{-1}$.

8. The method of claim 1 in which the viscosity increasing step is carried out in a polymer cooling unit.

9. The method of claim 1 in which the step of forming a bubble includes a stretching step, which orients the film.

10. The method of claim 9 in which the stretching step is carried out using a blown film orientation process.

11. The method of claim 1 which further includes annealing the film.

12. The method claim 11 in which the annealing step is carried out at a temperature ranging from about 120° F. to about 285° F.

13. The method of claim 11 in which the annealing step is carried out at a temperature ranging from about 140° F. to about 250° F.

14. The method of claim 1 in which the bubble is heated at a temperature greater than about 100° F.

15. The method of claim 14 in which the heating step is carried out at a temperature ranging from about 100° F. to about 175° F.

16. The method of claim 15 in which the heating step is carried out at a temperature ranging from about 100° F. to about 160° F.

17. The method of claim 16 in which the heating step is carried out at a temperature ranging from about 100° F. to about 140° F.

18. A method of making a polylactic acid (PLA) blown film comprising (a) obtaining dry pellets of PLA, (b) melting the pellets to form a molten mass at a first desired viscosity value or range of values, (c) increasing the viscosity of the molten mass to a second desired viscosity value ranging from about 14,000 P to about 16,000 P at about 375° F. at an apparent shear rate of about 55 seconds$^{-1}$, (d) forming a bubble from the resulting molten mass, and (e) collapsing the bubble to form a film, in which the PLA blown film is substantially free of plasticizer.

19. The method of claim 18 in which the second viscosity value ranges from about 15,500 P to about 16,000 P at about 375° F. at an apparent shear rate of about 55 seconds$^{-1}$.

20. The method of claim 18 in which the second viscosity value is about 15,000 P at about 375° F. at an apparent shear rate of about 55 seconds$^{-1}$.

21. The method of claim 18 in which the viscosity increasing step is carried out in a polymer cooling unit.

22. The method of claim 18 in which the step of forming a heated bubble includes a stretching step, which orients the film.

23. The method of claim 22 in which the stretching step is carried out using a blown film orientation process.

24. The method of claim 18 which further includes annealing the film.

25. The method claim 24 in which the annealing step is carried out at a temperature ranging from about 120° F. to about 285° F.

26. The method of claim 24 in which the annealing step is carried out at a temperature ranging from about 140° F. to about 250° F.

27. The method of claim 18 in which the bubble is heated at a temperature greater than about 100° F.

28. The method of claim 27 in which the heating step is carried out at a temperature ranging from about 100° F. to about 175° F.

29. The method of claim 28 in which the heating step is carried out at a temperature ranging from about 100° F. to about 160° F.

30. The method of claim 29 in which the heating step is carried out at a temperature ranging from about 100° F. to about 140° F.

31. A method of pretreating a PLA polymer blend to allow the manufacture of a blown film, comprising (a) obtaining pellets of a PLA polymer blend, (b) melting the pellets to form a molten mass at a first desired viscosity value ranging from about 1,000 P to about 5,000 P at about 480° F. at an apparent shear rate of about 55 seconds$^{-1}$, and (c) cooling the molten mass to a second desired viscosity value or range of values, in which the PLA polymer blend is substantially free of plasticizer.

32. The method of claim 31 in which the melting step is carried out at a temperature range of about 375° F. to about 425° F.

33. The method of claim 31 in which the first viscosity value is about 3,000 P at about 480° F. at an apparent shear rate of about 55 seconds$^{-1}$.

34. The method of claim 31 further comprising annealing the film at a temperature ranging from about 140° F. to about 250° F.

35. A method of making a polylactic acid (PLA) blown film comprising (a) obtaining dry pellets of PLA, (b) melting the pellets to form a molten mass at a first desired viscosity value ranging from about 1,000 P to about 5,000 P at about 480° F. at an apparent shear rate of about 55 seconds$^{-1}$, (c) increasing the viscosity of the molten mass to a second desired viscosity value ranging from about 14,000 P to about 16,000 P at about 375° F. at an apparent shear rate of about 55 seconds$^{-1}$, (d) forming a bubble from the resulting molten mass, and (e) collapsing the bubble to form a film, in which the PLA blown film is substantially free of plasticizer.

36. The method of claim 35 in which the viscosity increasing step is carried out in a polymer cooling unit.

37. The method of claim 35 in which the step of forming a heated bubble includes a stretching step, which orients the film.

38. The method of claim 37 in which the stretching step is carried out using a blown film orientation process.

39. The method of claim 35 which further includes annealing the film.

40. A method of pretreating a PLA polymer blend to allow the manufacture of a blown film, comprising (a) obtaining pellets of a PLA polymer blend, (b) melting the pellets to form a molten mass at a first desired viscosity value, and (c) cooling the molten mass to a second desired viscosity value ranging from about 14,000 P to about 16,000 P at about 375° F. at an apparent shear rate of about 55 seconds$^{-1}$, in which the PLA polymer blend is substantially free of plasticizer.

41. The method of claim 40 in which the melting step is carried out at a temperature range of about 375° F. to about 425° F.

42. The method of claim 40 in which the first viscosity value is about 3,000 P at about 480° F. at an apparent shear rate of about 55 seconds$^{-1}$.

43. The method of claim 40 further comprising annealing the film at a temperature ranging from about 140° F. to about 250° F.

* * * * *